United States Patent [19]

Keen, Egbert

[11] Patent Number: 4,678,359
[45] Date of Patent: Jul. 7, 1987

[54] DEVICE COMPRISING A FRAME OF LENGTHS OF TUBE AND COUPLING PIECES AND COUPLING PIECE FOR THE SAME

[76] Inventor: Keen, Egbert, 27, Lijsterbesstraat, 9861 EA Grootegast, Netherlands

[21] Appl. No.: 701,510

[22] Filed: Feb. 14, 1985

[30] Foreign Application Priority Data

Feb. 17, 1984 [NL] Netherlands ............... 8400519

[51] Int. Cl.⁴ .............................................. F16D 1/00
[52] U.S. Cl. .................................. 403/170; 403/176; 403/205; 403/292; 403/403; 312/140
[58] Field of Search .................. 403/292–295, 403/298, 170, 171, 172, 176, 205, 401, 402, 403; 312/140

[56] References Cited

U.S. PATENT DOCUMENTS

| | | | |
|---|---|---|---|
| 3,218,097 | 11/1965 | Bower et al. | 403/295 |
| 3,650,553 | 3/1972 | Wennstrom | 403/298 X |
| 3,752,511 | 8/1973 | Racy | 403/292 X |
| 3,912,410 | 10/1975 | Pofferi | 403/170 |
| 4,012,153 | 3/1977 | Pidgeon et al. | 403/170 |
| 4,082,470 | 4/1978 | Alberts | 403/295 |

FOREIGN PATENT DOCUMENTS

| | | | |
|---|---|---|---|
| 2404088 | 9/1975 | Fed. Rep. of Germany | 312/140 R |
| 2722425 | 11/1977 | Fed. Rep. of Germany | 403/294 |
| 2645835 | 11/1977 | Fed. Rep. of Germany | 403/172 |
| 2262217 | 9/1975 | France | 403/172 |
| 436610 | 11/1967 | Switzerland | . |
| 1497403 | 1/1978 | United Kingdom | . |
| 2070721 | 9/1981 | United Kingdom | 403/170 |

Primary Examiner—Richard J. Scanlan, Jr.
Assistant Examiner—Todd G. Williams
Attorney, Agent, or Firm—John P. Snyder

[57] ABSTRACT

A device comprising a frame composed of lengths of tubing and coupling pieces interconnecting the same, coupling piece and coupling piece parts for the same, each coupling piece having a cubical body provided on each outer face with a recess with undercut engaging rims for receiving a base part of an arm connected with a tubing and having complementary engaging rims in a manner such that the arm is fixed in place at least in the direction transverse of the outer face. The edge of the body is equal to the thickness of the tubings, the body consists of two identical parts having a square head face, each part having complementary connecting means for joining a body part by a base face to the base face of the other body part in a direction transverse of the head face, while each side face has a recess which is accessible only from the base face for the base part of the arm and which forms, together with a corresponding recess in the other body part, the recess for receiving the base part of an arm.

8 Claims, 5 Drawing Figures

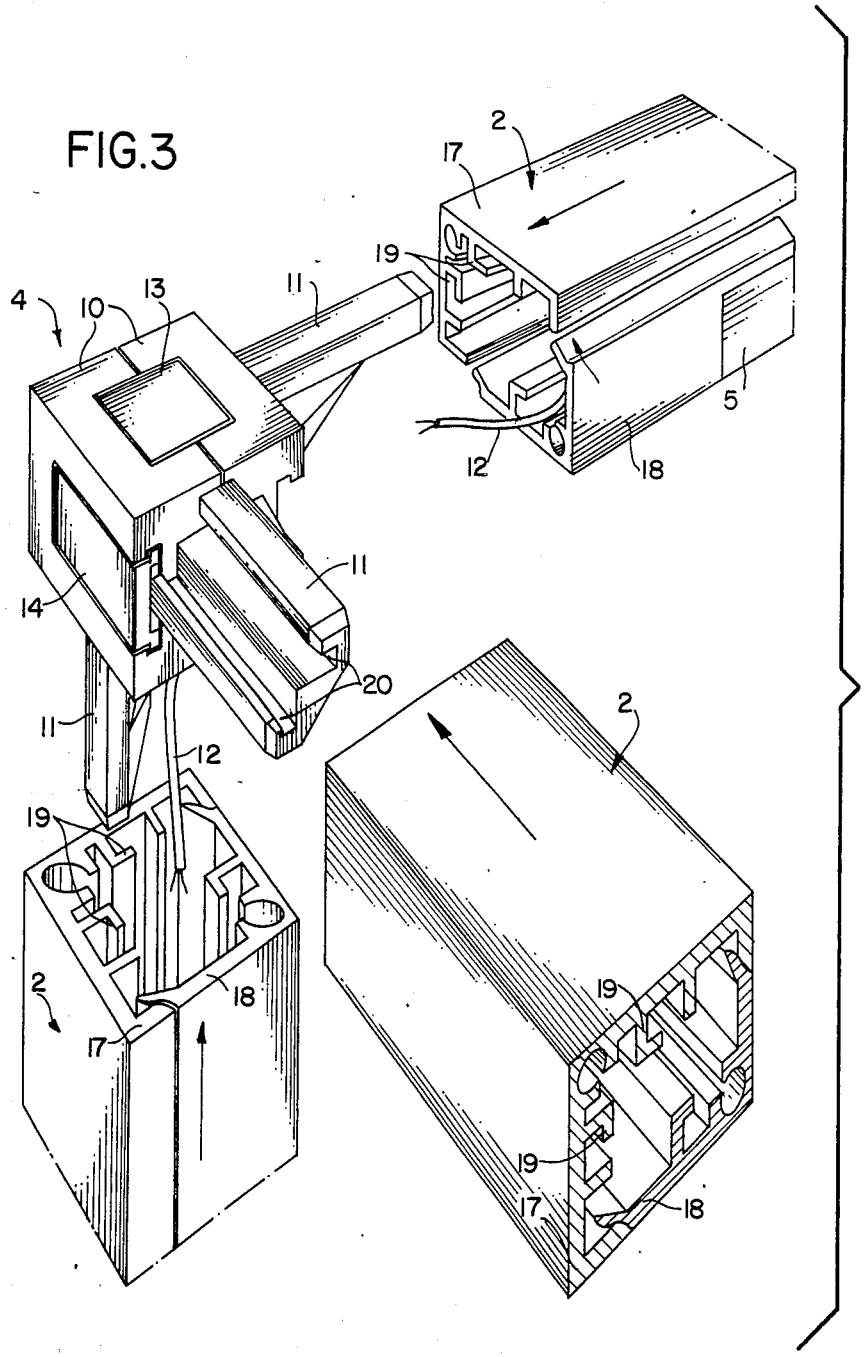

DEVICE COMPRISING A FRAME OF LENGTHS OF TUBE AND COUPLING PIECES AND COUPLING PIECE FOR THE SAME

BACKGROUND OF THE INVENTION

The invention relates to a device comprising a frame composed of lengths of tubing and coupling pieces interconnecting the same, each coupling piece having a cubical body provided on each outer face with a recess with undercut engaging rims for receiving a base part of an arm connected with a tubing and having complementary engaging rims in a manner such that the arm is fixed in place at least in the direction transverse of the outer face.

Such a device is known from FR-A-2,262,217, from which the coupling piece is known particularly from FIGS. 5 to 7. In this known device the base parts of each arm can be slipped laterally into a recess of an outer face. The outer faces of each coupling piece furthermore have a recess corresponding to the section of a tubing and adapted to receive one end of a tubing. After the tubing is arranged on the arm concerned in a manner such that the end thereof snaps into the recess concerned of the coupling piece the arm with the tubing is guarded against a lateral displacement with respect to the outer face.

The disadvantage of this known device is that the edge of the cubical body has to be larger than the width of a tubing so that the bodies of the coupling pieces project beyond the planes of the tubings. In this way mounting of panels in closing fashion in and on the device is rendered very difficult.

SUMMARY OF THE INVENTION

The invention has for its object to provide a device of the kind set forth above, in which the outer faces of the coupling pieces and the tubings can be coplanar.

This is achieved in a device according to the invention in that the edge of the body is equal to the thickness of the tubings, in that the body consists of two identical parts having a square head face, each part having complementary connecting means for joining a body part by a base face to the base face of the other body part in a direction transverse of the head face, whilst each side face has a recess which is accessible only from the base face for the base part of the arm and which forms, together with a corresponding recess in the other body part, the recess for receiving the base part of an arm. In this way the base parts of the arms can be immovably fixed in the body when joining the body parts. Therefore, said additional recess in each outer face for receiving the end of the tubing concerned is redundant so that the edge of the cubical body can be equal to the width of a tubing. The recesses in the head faces of each body part have to remain laterally accessible for the base part of an arm. However, an arm part arranged in a head face is fixed against displacement by the wall of the tubing on the side towards which the recess is open so that also the tubings connected with a head face are fixed against displacement in the body. In configurations of the coupling piece in which the recess in one head face or in both head faces has to be used, a tubing on the side face towards which the recess in the head face is open is necessary. Each configuration of the coupling piece can thus be obtained, in which it is ensured that the arm parts and hence the tubings are fixed in place with respect to the body so that the cubical body may have an edge equal to the width of a tubing.

In an advantageous embodiment of the invention the connecting means of the body part comprise two pins located near opposite corners of the base face and being at right angles thereto and bores extending from the base face into the body part near the other opposite corners, whilst the points of intersection of the centre lines of the pins and the bores with the base face determine a rectangle having sides extending parallel to the sides of the base face. The pins of one body part can snap into bores of a further body part, whilst the pins of the other body part snap into the bores of the first body part. After the arms are inserted in the desired manner into the recesses and the body parts have their pins slipped into the opposite bores, the ends of the pins can be deformed in known manner so that the pins are fixed in the associated bores and the body parts are undetachably interconnected so that an integral coupling piece is obtained.

When a coupling piece is used in the field of view a closing plate can be arranged in at least one recess of the coupling piece, in accordance with a further aspect of the invention, the head face of said plate coinciding with the side face concerned of the body in the mounted state. Thus the closed piece has a closed appearance.

The invention provides particular advantages when at least one of the lengths of tubing consists of two profiles divisible in the longitudinal direction, an associated arm is provided with engaging means co-operating with one of the profiles and the bases of the arms and the recesses have a square shape. Such divisible profiles, which may be used for accommodating lighting fittings, can thus be connected in different rotational positions with the coupling piece by inserting the arm concerned in the rotational position concerned into the recess. In this way many tens of relatively different coupling pieces can be assembled from only two different parts in accordance with the invention.

In a further development of the invention at least the arm base has a passage connecting the interior of a length of tubing with the interior of a coupling piece. It is thus possible to pass ducts, in particular electric conductors through the frame.

At least the body parts and the arms of each coupling piece are preferably manufactured by spray-casting a hard aluminium alloy. Thus an economic method of manufacture can provide a coupling piece satisfying high requirements of strength.

The invention relates to and provides a further coupling piece and parts thereof apparently intended to form a device of the kind described above.

The invention will be described more fully hereinafter with reference to the embodiments shown in the accompanying drawings.

BRIEF DESCRIPTION OF THE DRAWING FIGURES

FIG. 3 is a perspective view with disengaged parts in the direction of the arrow III in FIG. 1.

DETAILED DESCRIPTION

Figure 1:
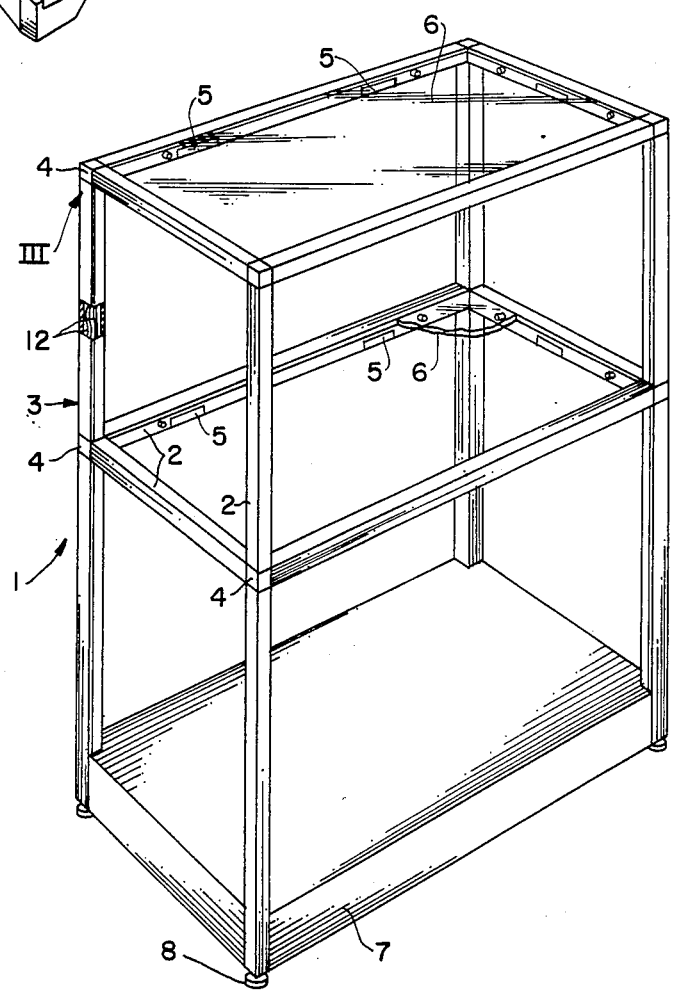
FIG. 1 shows a device embodying the invention.

The device shown in FIG. 1 is a show case comprising a frame 3 assembled from lengths of tubing 2 and coupling pieces 4 interconnecting said lengths of tubing 2. In the show case 1 are arranged glass plates 6 disposed on lugs. The lower ends of the vertical tubings are provided with setting feet 8 for setting the show case 1 in a horizontal position.

In the special use of a device embodying the invention described here the tubings 2 hold lighting fittings 5 at a plurality of places. The consequences thereof for the frame 3 will be discussed hereinafter. It is noted here that the electric conductors for the lighting fittings 5 are passed through the tubings 2 and the coupling pieces 4. The lighting fittings are suitable low-voltage fittings and the foot 7 of the show case 1 comprises the required transformer with the required connecting elements for the separate fittings 5. The fittings 5 illuminate very nicely the objects exposed in the show case 1. When the show case is completely closed by glass, no troublesome mirror effect due to the light sources will occur in contrast to external illumination by spot lights.

Figure 2:
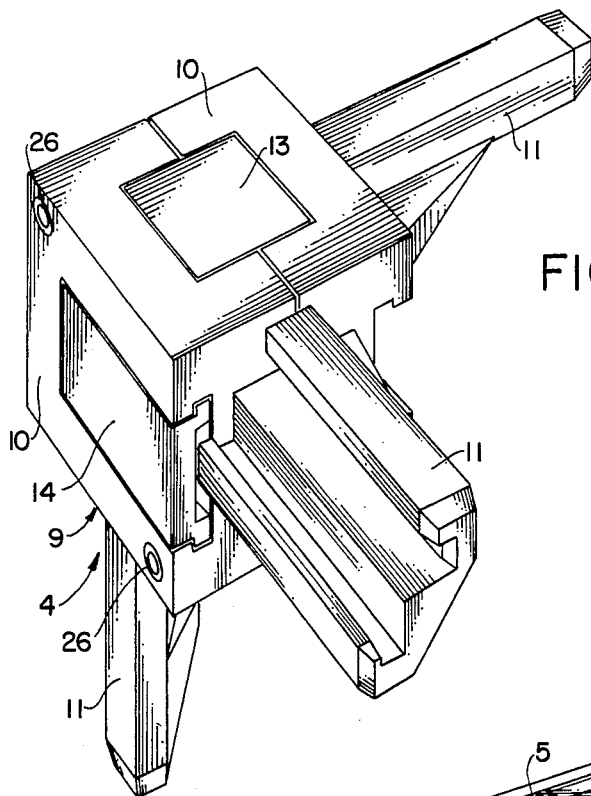
FIG. 2 is a perspective view of a coupling piece used in the device of FIG. 1.

FIGS. 2 and 3 show that a coupling piece 4 comprises a cubical body 9 and a plurality of arms 11 projecting from side faces of the body 9 for engaging ends of the tubings 2. The ends of the tubings 2 engage the projecting arms with some clamping effect and can be fixed thereto with the aid of a set screw.

Figure 4:
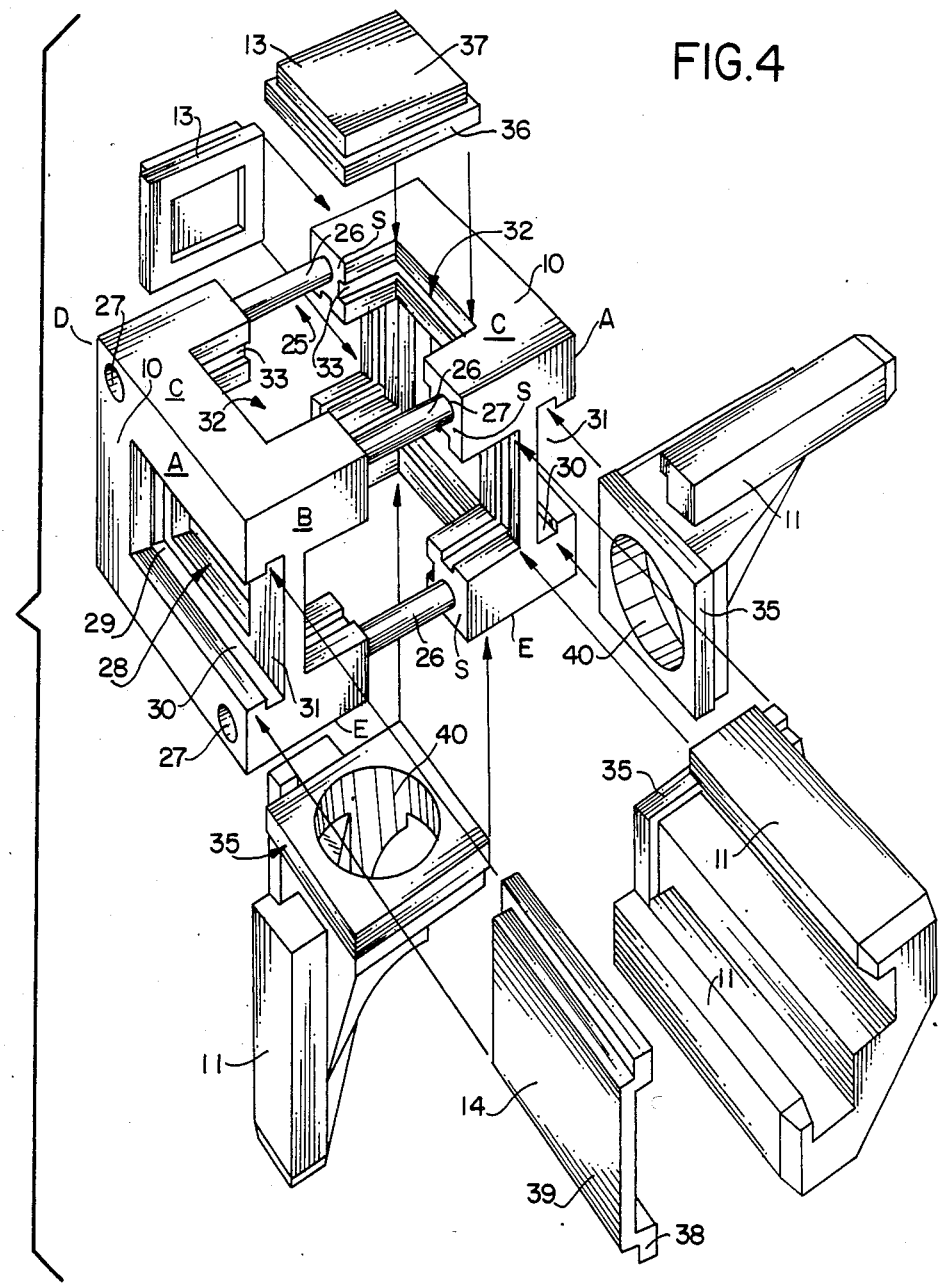
FIG. 4 shows the coupling piece of FIGS. 2 and 3 with disengaged parts.

FIG. 4 illustrates the way of assembling a coupling piece 2 embodying the invention.

The body 9 of the coupling piece consists of two identical body parts 10. Each body part has mainly the shape of a rectangular parallelopiped having a square base face (S) and a height equal to half the width. Thus two body parts joined by their base faces form a cube. Each body part 10 is provided with complementary connecting means 25 by which two body parts 10 can be fixed to one another by their base faces. In the embodiment shown the connecting means 25 are formed by two pins 26 near opposite corners of the base face and bores 27 near the other opposite corners. From FIG. 4 it is apparent that the pins 26 and the bores 27 define a square. In order to permit of interconnecting two identical body parts it is, however, sufficient for the pins and the bores to define a rectangle having sides parallel to the sides of the base face.

The pins of one body part 10 can thus be received in the bores 27 of the opposite body part 10. The pins 26 have a length such that in the assembled state of the two body parts 10 they extend up to the head face of the end face concerned as is shown in FIGS. 2 and 3. By deforming the end of the pin 26 in the bore 27 the body parts are firmly secured to one another.

Each body part 10 has a recess 28 in its head face (A). A groove 29 is formed in the wall of the recess 28. The groove 29 adjoins a prolonged groove 30 extending towards a side face (B). Thus the groove 29 and the recess 28 are accessible at 31 from this side face (B).

Each side face (B, C, D and E) of the body part 10 also has recesses 32. The recesses 32 are open towards the base face (S) of the body part 10 and can form together with a corresponding recess 32 in the co-operating body part 10 a continuous recess. The recesses 32 have a groove 33. For reasons to be described hereinafter the recesses 28 and 32 have a square shape. They can receive the square, plate-shaped base 35 of an arm 11 in the groove 33 or 29. An arm can be slid from the access 31 into a recess 28 and from the base face (S) into a recess 32 in the state in which the body parts 10 are still separated from one another.

In the case in which the coupling piece remains in the field of view, closing plates can be arranged in the recesses 28 and 32 not receiving arms. In the case of a recess composed of two recesses a square closing plate 13 is used, the rim 36 of which snaps into the groove 33. The head face 37 of the closing plate 13 coincides, in the mounted state, with the side face concerned of the body 9. A recess 28 in the head face (A) of a body part can be filled with a closing plate 14 also having a complementary shape and being provided with a rim 38 snapping into the groove 29 and the prolonged groove 30. The head face 39 of the closing plate 14 coincides, in the mounted state, with the head face (A) of the body part 10 concerned. Thus the closing plates 13 and 14 provide an uninterrupted appearance as shown in FIGS. 2 and 3.

In the embodiment shown the lengths of tubing 2 consist of two profiles 17, 18 divisible in the longitudinal direction. The lighting fittings 5 are mounted in the profile parts 18. The frame 3 is built up in a first instance without the profile parts 18. The coupling pieces are designed so that the arms 11 thereof are provided with engaging means co-operating with the profile part 17. These engaging means are formed by hook-like profiles 19 near the inner corner of the profile part 17 by co-operating recesses 20 in the arms 11. After the frame has assumed its basic form by connecting the profile parts 17 with the aid of the coupling pieces, the electric conductors 12 can be arranged in place for the lighting fittings 5. According to an important aspect of the invention at least the base 35 of each arm 11 has a passage 40 establishing a communication between the interior of a tubing 2 and the interior of a coupling piece. The electric conductors 12 can thus be very readily arranged at their places whilst the profile parts 18 have not yet been mounted. Subsequently the profile parts 18 with or without lighting fittings 5 are snapped into the associated profile parts 17.

Figure 5:
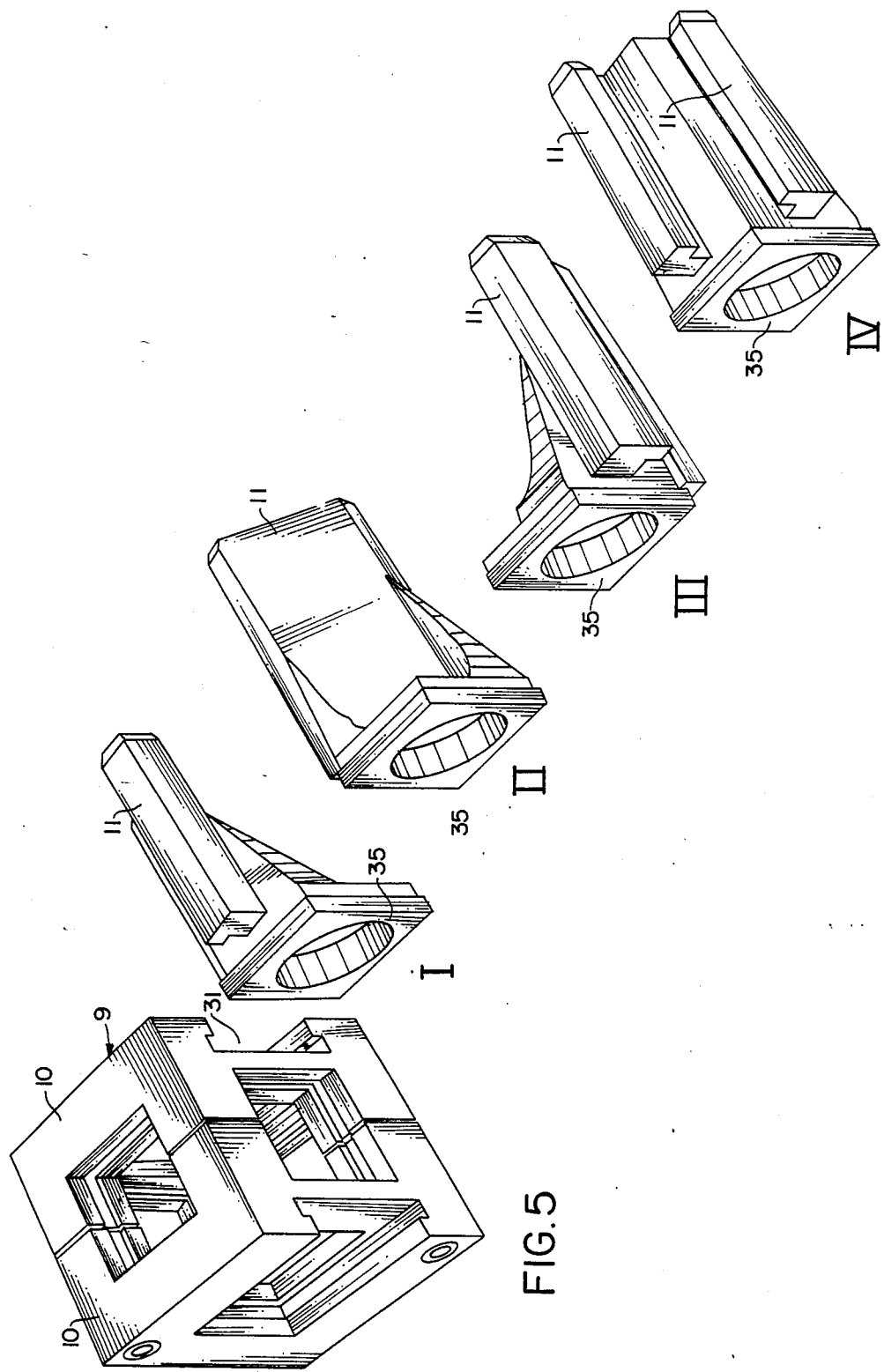
FIG. 5 illustrates the various possibilities of connecting an arm with a body of a coupling piece.

As stated above the base 35 of each arm 11 and the recesses in the body 9 have a square shape. This provides the important advantage that each arm can be arranged in four different angular positions in a coupling piece. These angular positions are designated by FIG. 5 by I, II, III and IV. It will be obvious that it is thus also posible to arrange the profile parts 18 in the angular positions concerned in the frame. Consequently the flexibility of use of the coupling piece is particularly great.

The base of the arms and the recesses in the body may, however, have a shape different from the square. When using a non-square, rectangular shape each arm can be used in two angular positions. There is furthermore conceivable a design providing only one possibility of mounting.

Although the device embodying the invention is particularly suitable for specific uses such as the use described above with lighting fittings arranged in the tubings, the invention is not limited to this particular use. The invention is particularly advantageous in the case of relatively low production rates or when the number of variations of the coupling pieces is so great that a satisfactory control of stock and orders is no longer feasible.

What is claimed is:

1. In a composite frame assembly, the combination of a coupling piece of hollow, cubic form presenting two parallel head faces and four side faces, said coupling piece being formed of two identical parts separated along a plane parallel to said head faces to allow said parts to be brought together into the cubic form and so that each side face is perpendicular to such plane; connecting means for securing said parts together; at least one of said side faces having a recess therein leading to the interior of said coupling piece and defining a pair of grooves in each part in which each pair of grooves is aligned with the other pair of grooves at said plane and extends therefrom toward but short of a head face of its corresponding part; an arm member having a base portion and an arm projecting perpendicularly from said base portion to define a longitudinal axis, said base portion defining parallel flanges held captive within said grooves when the parts are secured together so that the arm member may be oriented in one of at least two rotational positions about said axis relative to said one side face prior to said parts being brought together, said arm having a tubing-receiving portion which is asymmetrical relative to said axis; and a length of tubing having an asymmetrical interior adapted to receive said tubing-receiving portion of the arm.

2. In a composite frame as defined in claim 1 wherein said base of the arm member is square and defines two pairs of flanges adapted to be received in said grooves whereby the arm member is rotational into four different orientations about said axis relative to said one side face.

3. In a composite frame as defined in claim 2 wherein said length of tubing is formed of two longitudinally separated parts.

4. In a composite frame as defined in claim 2 wherein said length of tubing is formed of two longitudinally separated parts.

5. In a composite frame assembly, the combination of a coupling piece of hollow form presenting two parallel head faces and four side faces, said coupling piece being formed of two separate parts each having a base face to allow said parts to be brought together with their base faces juxtaposed to define the various head and side faces thereof; connecting means for securing said parts together; at least some of said side faces having a recess therein leading to the interior of said coupling piece and each recess defining a pair of grooves in each part extending from the respective base faces thereof in which each pair of grooves is aligned with the other pair of grooves at such respective base faces thereof; at least one arm member having a base portion having flanges dimensioned to be received in an aligned pairs of grooves only when the parts are separated to expose said base faces and an arm projecting from said base portion, said flanges of the base portion being held captive in the pairs of grooves of one of said recesses when said parts are brought together so that said arm may be rotationally oriented into one of a plurality of positions relative to said coupling piece before said parts are brought together.

6. In a composite frame as defined in claim 5 wherein said parts define a cube when brought together.

7. In a composite frame as defined in claim 5 wherein there are four rotational positions of said arm member, each a quarter of a rotation from an adjacent rotational position.

8. In a composite frame as defined in claim 5 including a longitudinally split tube having only one section adapted to receive said arm in secured relation thereto, the engagement of said one section with the arm being asymmetrical with relation to the axis of the tube, and the other section of the tube being releasably secured to said one section.

* * * * *